United States Patent [19]

Dimmick et al.

[11] Patent Number: 4,538,193
[45] Date of Patent: Aug. 27, 1985

[54] AERODYNAMICALLY RELEASED SAFETY LATCH FOR DATA TRANSDUCER ASSEMBLY IN ROTATING RIGID DISK DATA STORAGE DEVICE

[75] Inventors: W. Scott Dimmick, Atherton; Charles S. Mitchell, Portola Valley; William G. Moon, Sunnyvale, all of Calif.

[73] Assignee: Quantum Corporation, Milpitas, Calif.

[21] Appl. No.: 439,897

[22] Filed: Nov. 8, 1982

[51] Int. Cl.³ .............................................. G11B 21/20
[52] U.S. Cl. .................................. 360/137; 360/103
[58] Field of Search ............... 360/103, 104, 105, 109, 360/137

[56] References Cited

U.S. PATENT DOCUMENTS 3,702,997 11/1972 Jamieson ..................... 360/105 X

*Primary Examiner*—John H. Wolff
*Assistant Examiner*—Steven B. Detofsky
*Attorney, Agent, or Firm*—David B. Harrison

[57] ABSTRACT

An aerodynamically released safety shipping latch for a rotating disk data storage device is disclosed. A moveable airvane means adjacent a rotating disk is deflected by airflow generated by disk rotation from an at-rest biased first position to a second position. A safety latch communicating with the airvane means releases the data transducer carriage from a landing zone position when the airvane means moves to the second position in response to airflow from disk rotation.

17 Claims, 4 Drawing Figures

AERODYNAMICALLY RELEASED SAFETY LATCH FOR DATA TRANSDUCER ASSEMBLY IN ROTATING RIGID DISK DATA STORAGE DEVICE

BACKGROUND OF THE INVENTION

The present invention relates to safety latches for locking a data transducer assembly against inadvertent movement across a data storage surface within a rigid disk data storage device. More particularly, the present invention relates to a safety latch which locks the data transducers at their landing zones on the disk surfaces except when a sufficient airflow is generated by disk rotation as to release the latch and thereby enable the transducers to leave the landing zone region.

Rotating rigid disk magnetic storage devices (sometimes referred to as "drives") typically utilize data transducers which fly upon an air cushion immediately adjacent to the storage surface. The transducer is held just above the surface by an air bearing effect. This technique, widely used in presently known disk drives, is sometimes referred to as "Winchester technology".

In disk drives employing Winchester technology the data transducers are supported by a carriage assembly which is normally biased to position the transducers at a predetermined landing zone on the disk storage surface. In some cases the landing zone is located inside the innermost annular data storage track of the storage surface. This bias is normally always present, and it is typically provided by a tension spring. In use of the drive, the bias is overcome by the forces applied by the carriage driving mechanism. In some cases, the driving mechanism may be a linear translator such as a linear voice coil solenoid. In other cases the driver may be a stepper motor or a rotary actuator. In any event, when power is removed, or when the storage disks are not rotating at their normal operating speed, the driver becomes disenabled, and the bias spring automatically returns the transducers to the landing zone region of the disk storage surfaces.

The disk storage surface is typically coated with a very thin magnetic material which stores the recorded data for later retrieval and/or replacement. The storage surface is packed with very high data densities, on the order of 10,000 bits or more per inch. The storage surface is particularly sensitive to being damaged. Any minute scratch or indentation may deform the storage surface, with resultant loss of data and data storage capability at the damage site.

The movement of a data transducer across the recording surface in the absense of the air bearing or cushion may result in damage to the storage surface from minute scratches or dents. The damage or deformity is caused because of a loading force provided to the transducer to urge it against the disk surface. The loading force is opposed to the force generated by the air bearing effect. The loading force is provided with a value which causes the transducer to come within 12 to 20 microinches of the storage surface during operation.

When the drive is not in operation, the loading force applied to the transducer may be sufficient to dent or gouge the storage surface in the absense of the protective air cushion. Also, the storage surfaces may be dented if the transducers are susceptible to severe, complex rotational and/or translational forces sometimes encountered during unusually rough shipping and handling. As disk drives become smaller, and as they move through commerce by common carriers unaccustomed to handling delicate instruments, such drives have become susceptible to storage surface damage arising from severe handling.

The most common damage sustained by severe handling has been denting of the storage surface. Such dents are caused by severe shock forces having substantial components normal to the parallel planes of the disk surfaces. As already mentioned, such dents are known to prevent the drive from storing data at the locations thereof. If such dents occur during shipment and/or handling between the factory and the user, their presence will go undetected until data storage errors are encountered by the user.

The requirement to lock the data transducer assembly of a rotating rigid disk data storage device during shipment and handling is recognized in the prior art. There are three general approaches: manual mechanical locking devices; solenoid safety latches which are disengaged only when the drive is in operation; and, permanent magnet latches which lock the assembly against movement in response to shocks below a threshold force level.

Manual locks are unsatisfactory because they require the intervention of an informed user. If the user is unaware of the manual lock, an attempt to use the drive may result in overload and damage to the transducer actuator. Conversely, the user must remember to engage the manual latch to prevent damage during shipments subsequent to original delivery. Solenoids are usually effective, but they add additional cost and power consumption overhead. Permanent magnets are only partially effective. They have the drawback that very severe shocks to the drive will overcome the locking force, leading directly to the infliction of the damage sought to be avoided.

One drawback of Winchester disk drives is that the unit must be assembled and operated in a very clean, dust free environment. Once assembled, the drive is enclosed within a hermetically sealed housing to protect against intrusion of unfiltered ambient air. This ultra-clean environment renders impractical the use of temporary, removeable locking members or devices to lock the actuator assembly within the disk drive enclosure.

One prior art approach is set forth in U.S. Pat. No. 3,503,056 which describes an aerodynamically operated microswitch for controlling a motor for lowering data transducers into operational position only after sufficient air velocity has been generated to deflect a vane which actuates the switch. This approach requires not only the air vane, but also complex electrical machinery which must be precisely aligned and operated.

Another prior art approach is followed in U.S. Pat. Nos. 3,172,962 and 3,180,943 wherein aerodynamic flow from rotation of a data storage drum operates a lever which lowers the data transducer into operating proximity relative to the data storage surface. That approach is not feasible in disk drives characterized by fixed transducer support arms which include bias springs applying a predetermined loading force to the data transducer, and wherein the data transducer is adapted to contact the storage surface at the landing zone (and anywhere else on the disk surface, absent the air bearing cushion).

A need has therefore arisen to provide a more satisfactory locking mechanism which will lock the data transducer assembly at a safe position whenever severe mechanical forces or shocks might be encountered, and which will release to enable normal operation of the drive when the storage disks are rotating.

SUMMARY OF THE INVENTION

One general object of the present invention is to provide an aerodynamically released locking mechanism for a rotating disk data storage device which effectively prevents transducer movement across data tracks during shipping and handling or at times and in situations other than when the drive is operating.

Another object of the present invention is to use airflow generated by rotation of magnetic storage disks to release a safety shipping and handling latch within the enclosed disk drive without user intervention.

Another object of the present invention is to provide a simple, inexpensive and very reliable mechanical locking mechanism which may be included within the sealed enclosure of a rotating rigid magnetic disk data storage device and which operates without any significant additional power consumption by using airflow already available within the enclosure.

These objects and advantages are achieved by providing moveable airvane means adjacent to a rotating disk within a data storage device for intercepting airflow generated by disk rotation. The airvane means is biased against a stop post in a direction opposed to airflow to a first position. Airflow moves the airvane means to a second position, and latch means communicating with the airvane means moves in a way which releases the data transducer carriage to enable it to move transducers to and among data storage tracks on the disk surface.

The foregoing and other objects, advantages and features of the present invention will become apparent from consideration of the following detailed description of a preferred embodiment, presented in conjunction with the accompanying drawing.

DETAILED DESCRIPTION OF A PREFERRED EMBODIMENT

Figure 1:
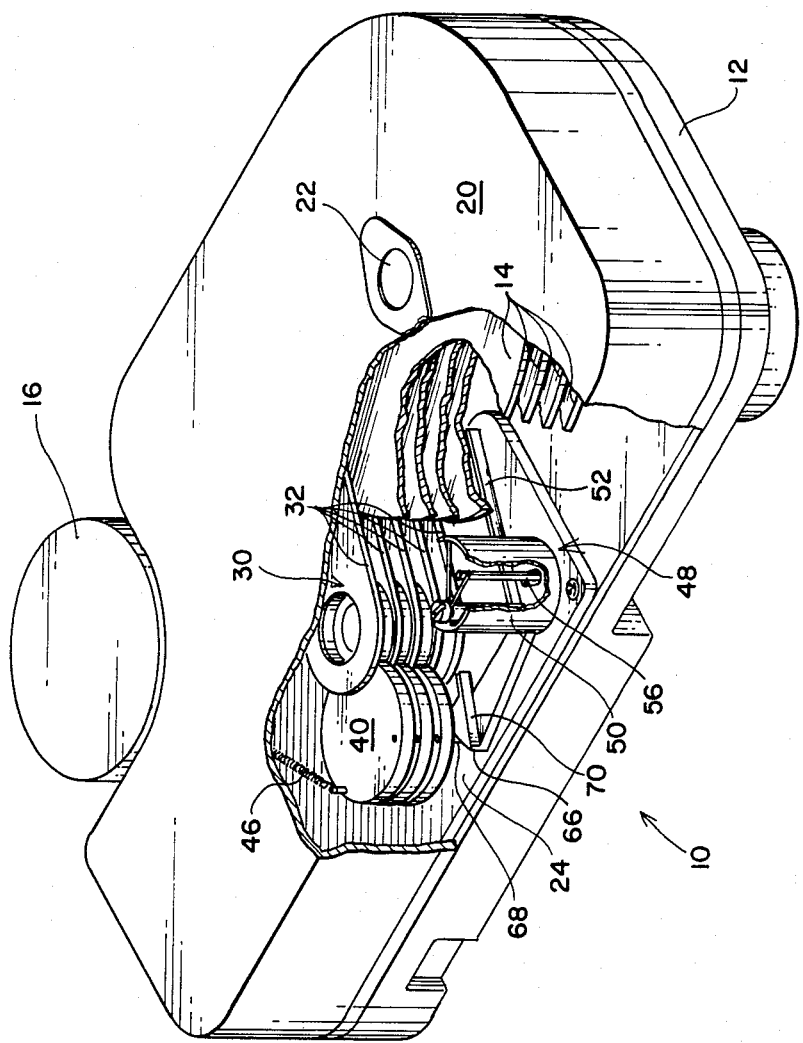
FIG. 1 is an isometric assembly drawing of a rotating disk data storage device which incorporates principles of the present invention. Structure has been broken away to facilitate understanding of the principles of the present invention.
Figure 2:
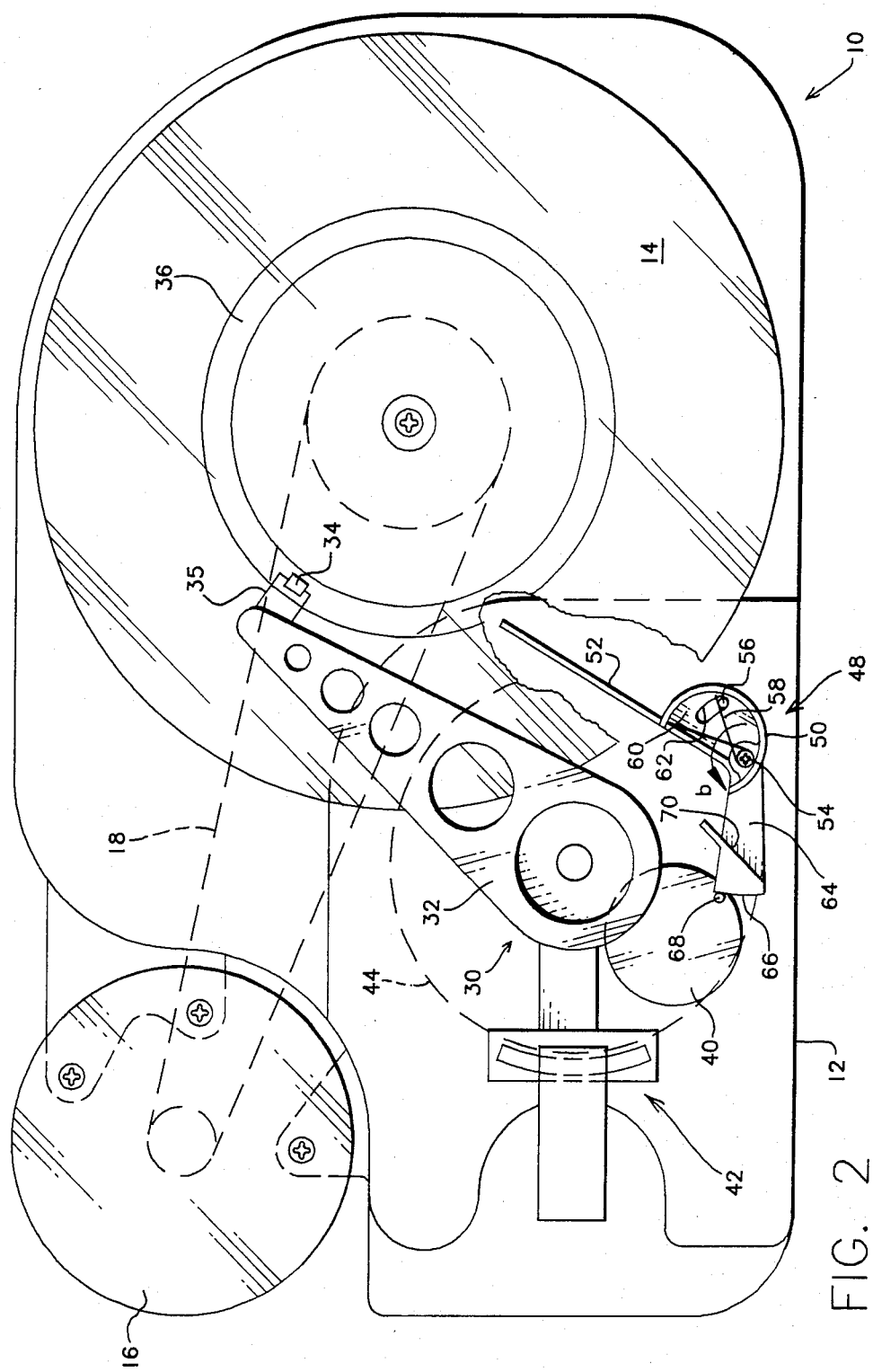
FIG. 2 is a somewhat schematic top plan view of the data storage device depicted in FIG. 1 with a portion of the rotating disks broken away.
Figure 3:
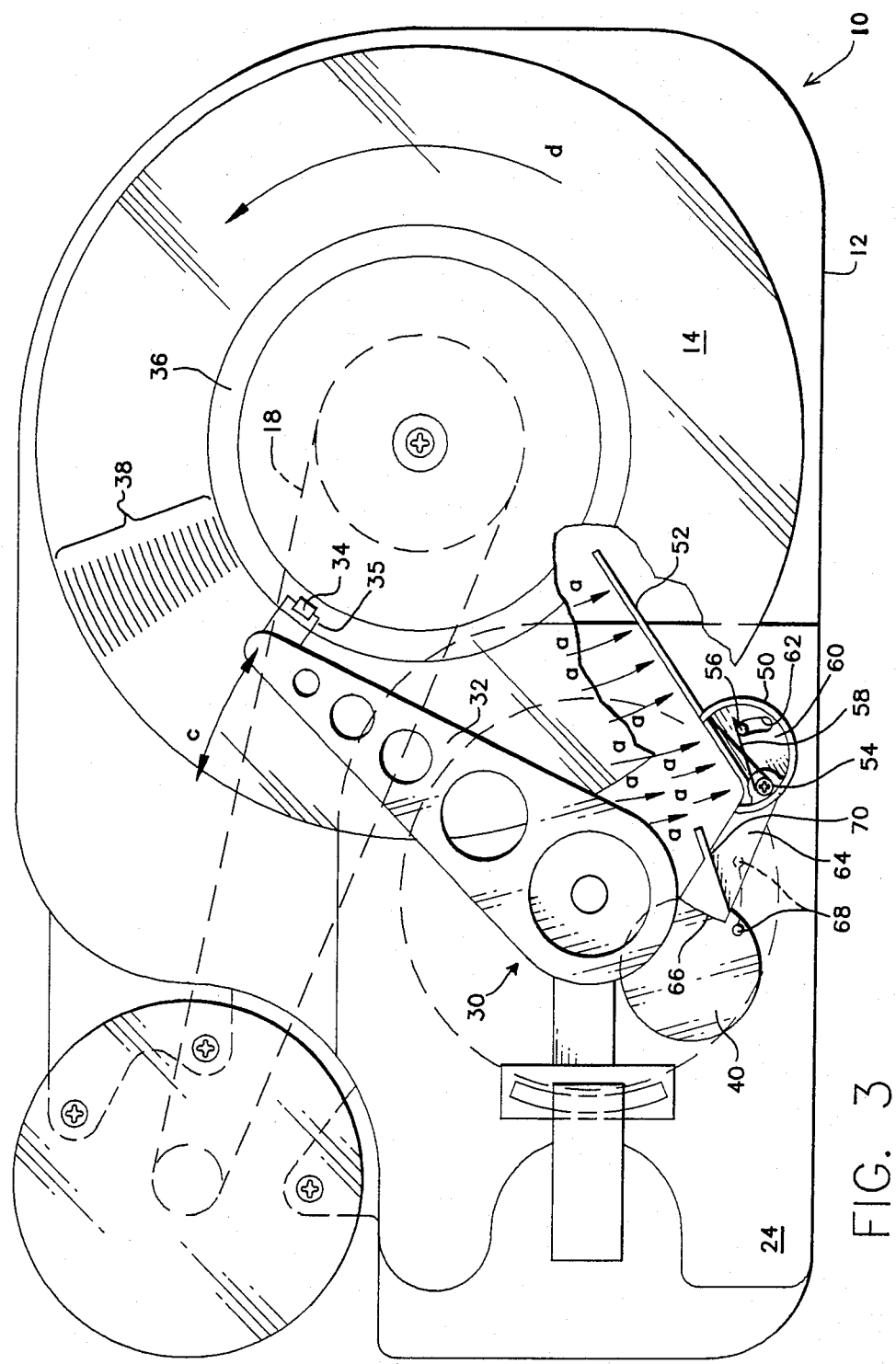
FIG. 3 is another schematic top plan view of a portion of the data storage device depicted in FIG. 1 showing operation of one embodiment of the present invention.
Figure 4:
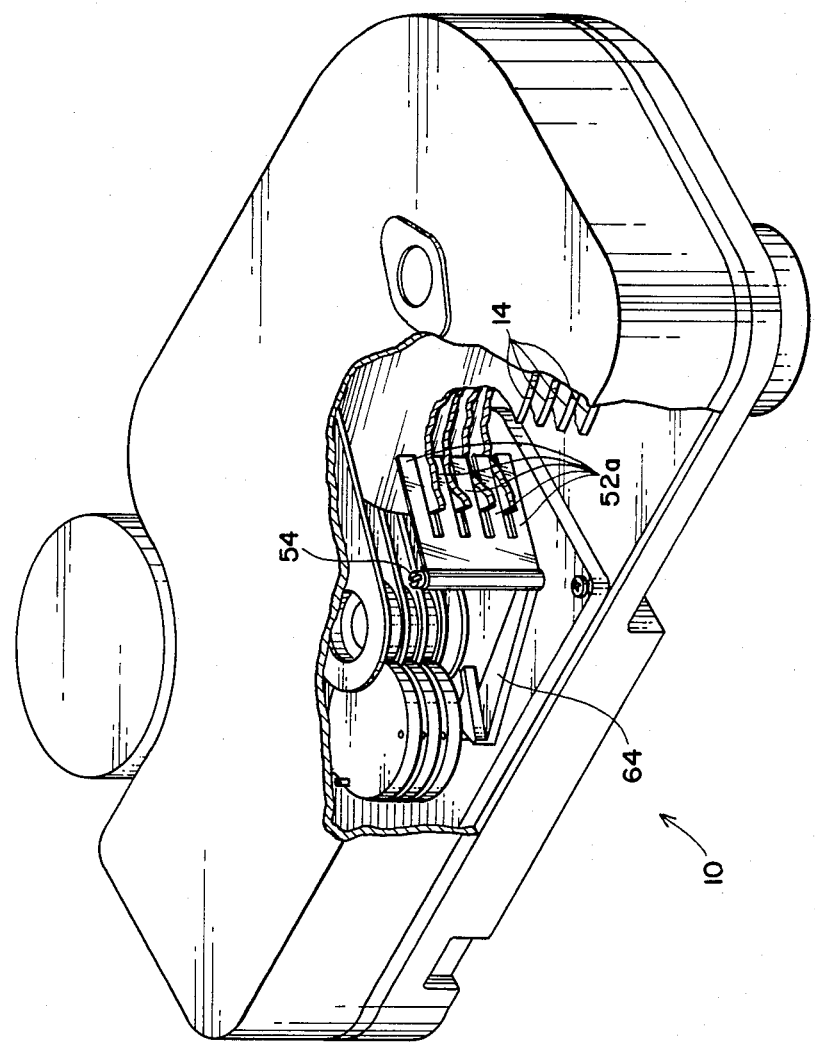
FIG. 4 is an isometric assembly drawing of a portion of a rotating disk data storage device incorporating an alternative preferred embodiment of the present invention.

One preferred embodiment of the present invention is depicted in FIGS. 1, 2 and 3. Another is depicted in FIG. 4. Other embodiments and variations will suggest themselves to those skilled in the art without departing from the spirit and scope of the present invention.

A rotating rigid disk drive 10 includes a cast aluminum base 12 and one or more rotating storage disks 14 having major surfaces thereof coated with magnetic storage media which are journalled at a common hub for rotation relative to the base 12. A suitable drive motor 16 is connected by a flexible belt 18 to rotate the disks 14 in the direction shown in FIG. 3 by the large curved arrow d.

The working parts of the drive 10 are encased within an airtight plastic cover 20 which includes a pressure equalizer or breather 22.

A carriage mechanism support plate 24 is mounted to the cast base 12 and supports a rotatable transducer carriage assembly 30 having support arms 32. Transducers 34 are supported at the ends of the arms by transducer flat springs 35 which apply about 10 grams of force urging the transducers 34 toward the disk surfaces.

The transducers 34 are intended to contact the coated disk storage surfaces only at an inner concentric-ring landing zone 36. The transducers 34 fly over multiple concentric-ring data tracks 38 by virtue of an air bearing cushion generated by rotation of the disks 14. The upward force generated by the air bearing overcomes the downward force of the springs 35 so that the transducers ride above the storage surface at a distance of about 12 to 20 microinches.

The transducer carriage assembly 30 also includes a plurality of counterweights 40 which counterbalance the arms 32, so that the bearings at the journal of the assembly 30 to the base 12 are evenly loaded. The assembly 30 also supports a moving scale which forms an operative portion of an optical encoder assembly 42 which may be used for data track boundary determination by the drive electronics. A rotary actuator 44, located beneath the mounting plate 24, generates torque to move the carriage assembly 30 along a locus of movement relative to the data tracks 38, the locus being generally indicated by the double headed arrow c in FIG. 3. A tension spring 46 extends between a post (not shown) and one of the counterweights 40 to bias the carriage assembly so that the transducers 34 normally rest at their landing zones 36 except during operation of the drive 10.

An aerodynamic safety shipping latch 48, embodying the principles of the present invention, is formed as a unitary injection-molded plastic part. The latch 48 includes a semicylindrical airscoop 50 and an airvane finger 52 which extends adjacently below the lowest surface of the disks 14 toward their journal. While only one airvane finger 52 is illustrated in the drawings, it will be apparent to those skilled in the art that a plurality of fingers 52 may interleave the disks in addition to, or in lieu of, the airscoop 50. Such an alternative embodiment is depicted in FIG. 4 wherein a plurality of fingers 52a lying generally in the same plane, interleave the storage disks 14.

A post 54 is secured to the mounting plate 24; and, an outer edge of the airscoop 50 defines a borehole through which the post extends, forming a journal for the latch 48 relative to the drive 10. A spring support post 56 is mounted to the mounting plate 24 adjacent to the post 54. A bias spring is mounted between the post 54, the post 56 and the inner edge portion of the airscoop 50 in a manner which applies a bias to the latch 48 in the direction shown by the arrow b in FIG. 2.

The airscoop 50 includes a bottom endwall 60 which defines a cylindrical segment slot 62 through which the post 56 extends. The slot 62 limits the amount of travel of the latch 48 between the positions shown respectively in FIGS. 2 and 3.

A latch member 64 is formed integrally with the airscoop 50 and airvane finger 52. The member extends outwardly from the region of the journal post 54. The member 64 includes a latching surface portion 66 which cooperates with a downwardly depending pin 68 mounted in the lowermost counterweight 40. The member 64 also includes a slide surface 70 which enables the pin 68 to travel freely along its locus of movement when the latch 48 is deflected by airflow, as shown in FIG. 3. In the event that the carriage 30 is in an extended position and the disks 14 are not rotating and thereby deflecting the latch 48, the surface 70 acts as a cam-follower surface which causes the latch member 64 to follow the pin 68 until it clears the surface 66, whereupon the latch snaps back into a locking engagement relative to the pin 68.

FIG. 2 depicts the drive 10 at rest, as during shipping and handling. Therein, the latch 48 is biased so that the latching surface portion 66 is in contact with the pin 68, and the carriage assembly 30 is precluded thereby from moving the trandsucers 34 away from their landing zones 36. Disk rotation, illustrated in FIG. 3, generates airflow depicted by the arrows a. This airflow impinges upon the airscoop 50 and airvane finger 52 with force sufficient to overcome the bias provided by the spring 58. The latch 48 thereupon moves to its second position as limited by the slot 62, shown in FIG. 3. In the second position, the latching portion 66 has cleared the pin 68, and the transducer carriage assembly 30 and transducers 34 are free to traverse over their range of intended movement, locus line c in FIG. 3. When the disks cease to rotate and thereby generate airflow a, the latch 48 returns to the position shown in FIG. 2 which locks the carriage 30 against moving the transducers 34 away from their landing zones 36. While the latch 48 will operate without the airtight plastic cover 20, it operates much more effectively with the cover 20 in place, which is the intended mode of operation.

It will be appreciated from the foregoing that the invention in an aerodynamically released safety shipping latch for an rotating disk drive has been achieved. The principles of the present invention may be successfully applied to disk drives with fixed media and predetermined landing zones, and it may also be equally applied to disk drives using removeable cartridge storage media wherein the transducer rest position is completely outside of the disk stack. Similarly, the present invention is effective to latch transducer carriages which operate linearly as well as rotationally. To those skilled in the art to which this invention relates, many changes in construction and widely differing embodiments and applications of the invention will suggest themselves without departing from the spirit and scope of the invention. The disclosures and the description herein are intended to be illustrative of one presently preferred embodiment and best mode of the invention and are not intended to be in any sense limiting.

We claim:

1. In a data storage device including a frame and one or more rigid rotating disks, at least one data transducer capable of riding in close proximity to a data storage major surface of said disk upon an air bearing created by rotation of said disk for writing and reading data on said surface, a transducer support carriage for supporting and moving said data transducer relative to said surface, and including a rest position for said transducer, and driver means for moving said carriage, an improved safety latch for locking said transducer at its rest position in the absense of disk rotation and for releasing in response to air flow generated by disk rotation, said latch comprising:

moveable airvane means disposed adjacent to said rotating disk, said airvane means being biased to a first position in opposition to the direction of airflow generated by disk rotation, said airvane means for moving in response to airflow generated by disk rotation to a second position in the direction of airflow, moveable latch means connected to said airvane means, said latch means for engaging said carriage to lock said transducer at said rest position when said airvane means is at said first position, and for releasing said carriage when said airvane means moves to said second position in response to airflow, and bias means for providing a predetermined bias to said airvane means to urge it to said first position, said predetermined bias being overridden by airflow generated by disk rotation enabling said airvane means to move to said second position.

2. The improved latch set forth in claim 1 wherein said airvane means comprises a semi-cylindrical airscoop having two straight and generally parallel edges with a curved portion therebetween defining said airscoop, said airscoop being journalled at one edge to said frame on an axis of rotation substantially parallel to the axis of rotation of said disk, said other edge being adjacent to said disk, and said portion having a generally concave surface facing the direction of airflow.

3. The improved latch set forth in claim 2 wherein said airvane means further comprises an airvane finger extending from said other edge to a major surface region of a said disk.

4. The improved latch set forth in claim 1 further comprising a post mounted to said frame, and wherein said latch defines a first stop engaging said post at said first position and a second stop engaging said post at said second position.

5. The improved latch set forth in claim 4 wherein said bias means comprises a spring having one end engaging said other edge and another end engaging said post.

6. The improved latch set forth in claim 1 wherein said carriage has a locking part and wherein said latch means comprises a member formed integrally with said airvane means and extending outwardly from the region of the journal thereof and having an outer peripheral portion defining a locking surface, said surface lockingly engaging said locking part when said airvane means is at said first position and releasingly disengaging said locking part when said airvane means is at said second position.

7. The improved latch set forth in claim 6 wherein said member further comprises a slide portion inwardly adjacent said locking surface for guiding said locking part around said locking surface portion of said member during construction and operation of said device.

8. The improved latch set forth in claim 1 wherein said airvane means comprises at least one airvane finger extending from a journal location beyond the periphery of said disk toward the hub thereof and adjacent to a major surface region thereof.

9. The improved latch set forth in claim 1 wherein said device comprises a plurality of rigid rotating disks and wherein said airvane means comprises a plurality of airvane fingers lying generally in a plane which is generally normal to the parallel planes of said disks and wherein at least one of said airvane fingers interleaves two of said disks.

10. In a data storage device including a frame, a housing secured thereto and the following components enclosed within said housing: one or more rigid rotating disks wherein each said disk defines a predetermined landing zone for a data transducer, at least one data transducer capable of riding in close proximity to a major surface of a said disk upon an air bearing created by rotation of said disk for writing and reading data on said surface and for resting on said surface when within said landing zone, a transducer support carriage for supporting and moving said data transducer relative to said surface including transducer bias means for urging said transducer toward said surface against said air bearing, and driver means for moving said carriage, an improved safety latch for locking said transducer at said landing zone in the absense of disk rotation and for releasing in response to air flow generated by disk rotation, said latch comprising:

moveable airscoop means disposed adjacent to said rotating disk, said airscoop means being biased to a first position in opposition to the direction of airflow generated by disk rotation, said airscoop means for moving in response to airflow generated by disk rotation to a second position in the direction of airflow, moveable latch means formed integrally with said airscoop means, said latch means for engaging said carriage to lock said transducer at said landing zone when said airscoop means is at said first postion, and for releasing said carriage when said airscoop means moves to said second position in response to airflow, and bias means for biasing said airscoop means to said first position, said bias means applying a force to said airscoop means which is overridden by airflow generated by disk rotation.

11. The improved latch set forth in claim 10 wherein said airscoop means comprises a semi-cylindrical airscoop having two straight and generally parallel edges with a curved portion therebetween defining said airscoop, said airscoop being journalled at one edge to said frame on an axis of rotation substantially parallel to the axis of rotation of said disk, said other edge being adjacent to said dis, said curved portion having a generally concave surface facing the direction of airflow.

12. The improved latch set forth in claim 11 wherein said airscoop includes an airvane finger formed integrally therewith which extends from said edge adjacent said disk in a direction generally toward the disk journal to said frame and in close proximity to a major surface region of said disk.

13. The improved latch set forth in claim 11 wherein said airscoop includes an integral bottom wall enclosing the bottom end of said curved portion, and further comprising a post mounted to said frame, and wherein said bottom wall defines a slot through which said post extends, said slot and said post defining said first position and said second position of said airscoop.

14. The improved latch set forth in claim 13 wherein said bias means comprises a spring having one end engaging said post and another end engaging said airscoop in a manner which urges it to move to said first position opposite the direction of airflow.

15. The improved latch set forth in claim 10 wherein said carriage has a locking part and wherein said integral latch means defines an outer periperal portion providing a locking surface for engaging said locking part whenever said airscoop means is at said first position and for releasingly disengaging said locking part when said airscoop means is at said second position.

16. The improved latch set forth in claim 15 wherein said member further comprises a slide portion inwardly adjacent said locking surface for guiding said locking part around said locking surface portion of said member during construction and operation of said device.

17. The improved latch set forth in claim 10 wherein said device comprises a plurality of rigid rotating data storage disks and wherein said moveable airscoop means comprises a plurality of airvane fingers lying generally in a plane generally normal to the parallel planes of said disks and wherein at least one said finger interleaves two of said disks.

* * * * *